April 7, 1953 C. A. NERACHER ET AL 2,633,948
TRANSMISSION CONTROL
Filed April 11, 1946 6 Sheets-Sheet 1

INVENTORS.
Carl A. Neracher,
Maurice C. Robinson.
BY Harness and Harris
ATTORNEYS.

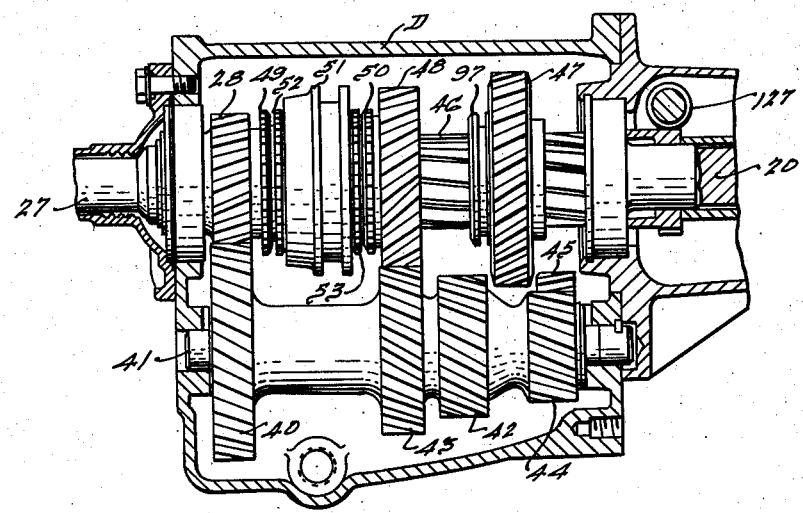
Fig. 4.
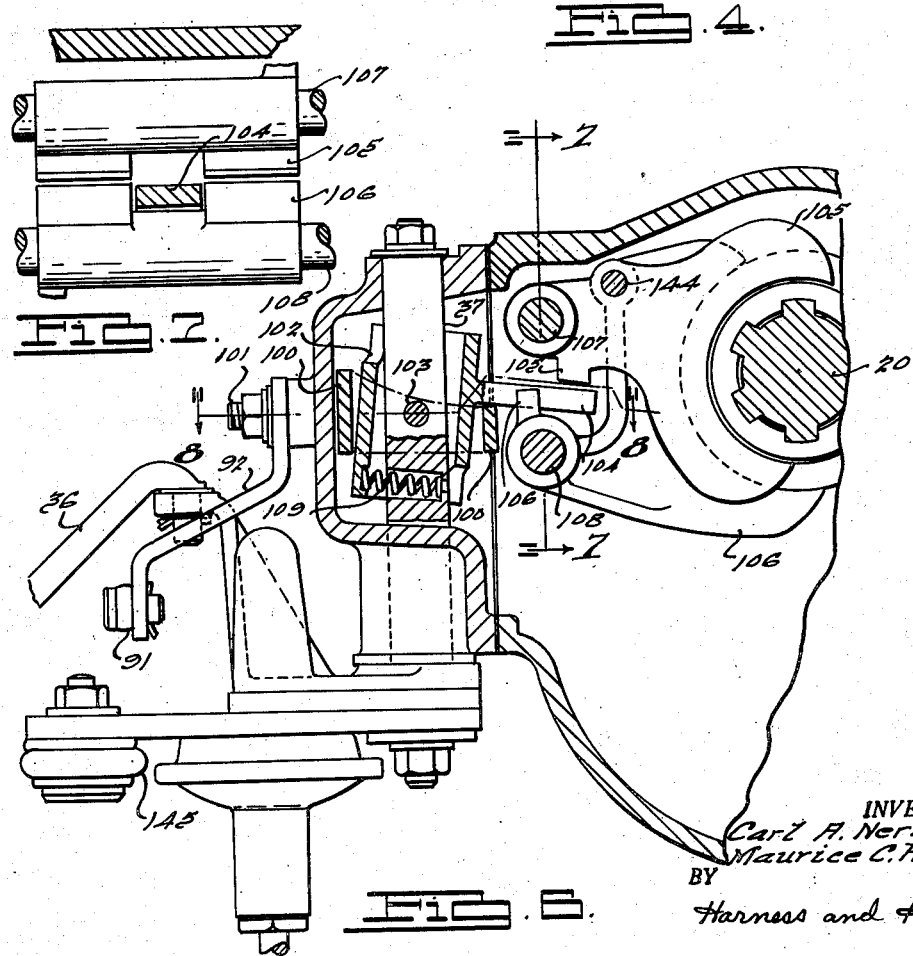
Fig. 7.
Fig. 5.
INVENTORS.
Carl A. Neracher,
Maurice C. Robinson.
BY Harness and Harris
ATTORNEYS.

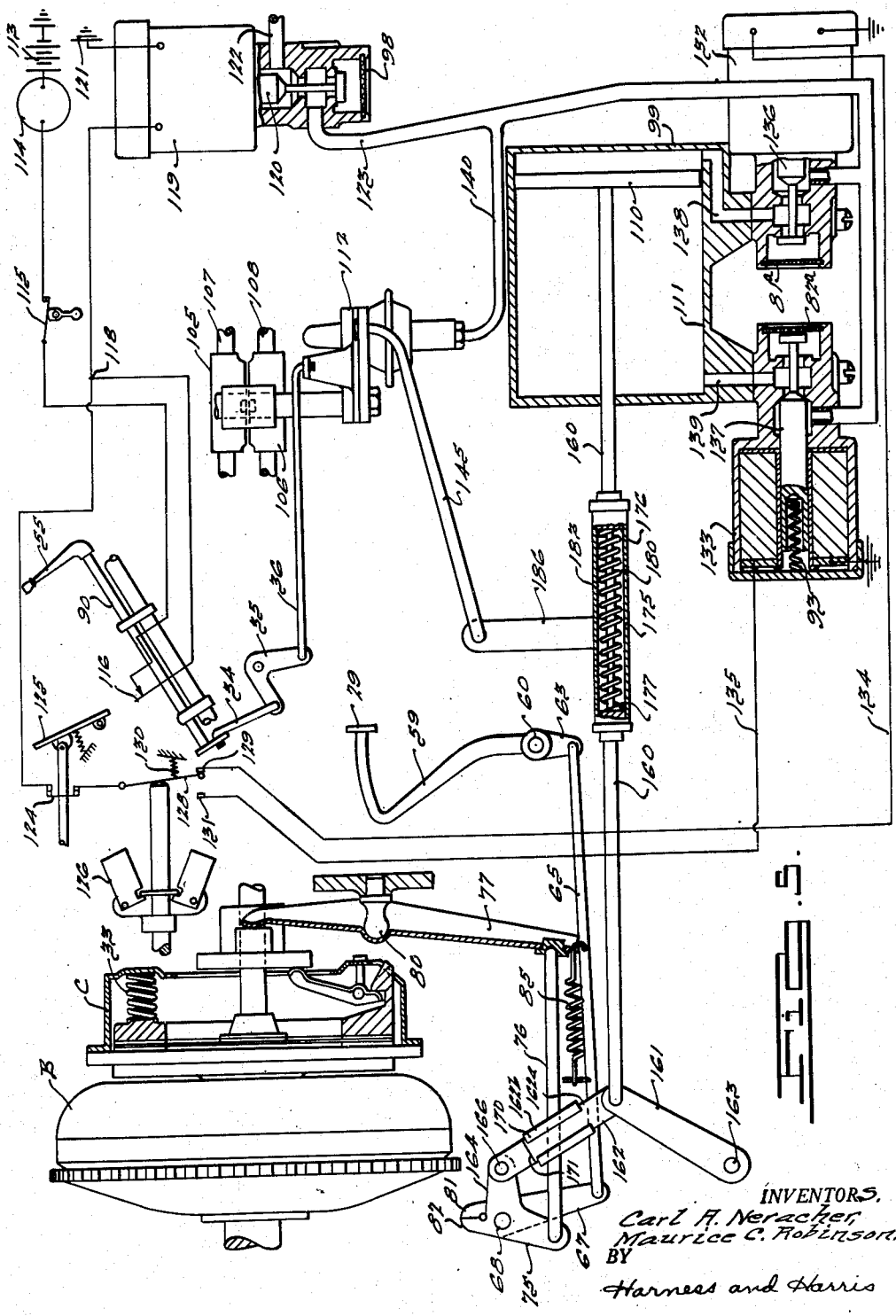

April 7, 1953  C. A. NERACHER ET AL  2,633,948
TRANSMISSION CONTROL
Filed April 11, 1946  6 Sheets-Sheet 4
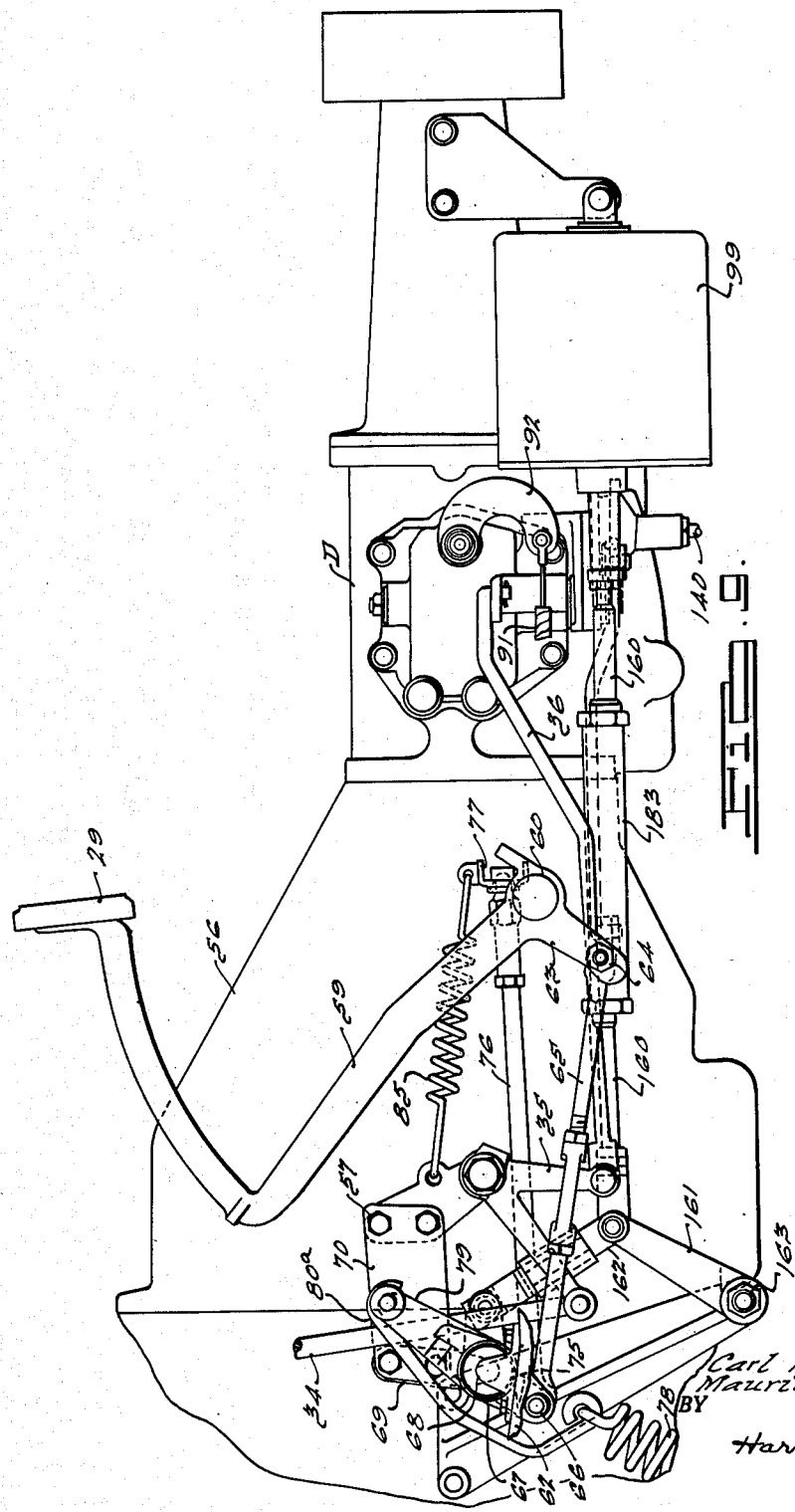
INVENTORS.
Carl A. Neracher,
Maurice C. Robinson
BY
Harness and Harris
ATTORNEYS.

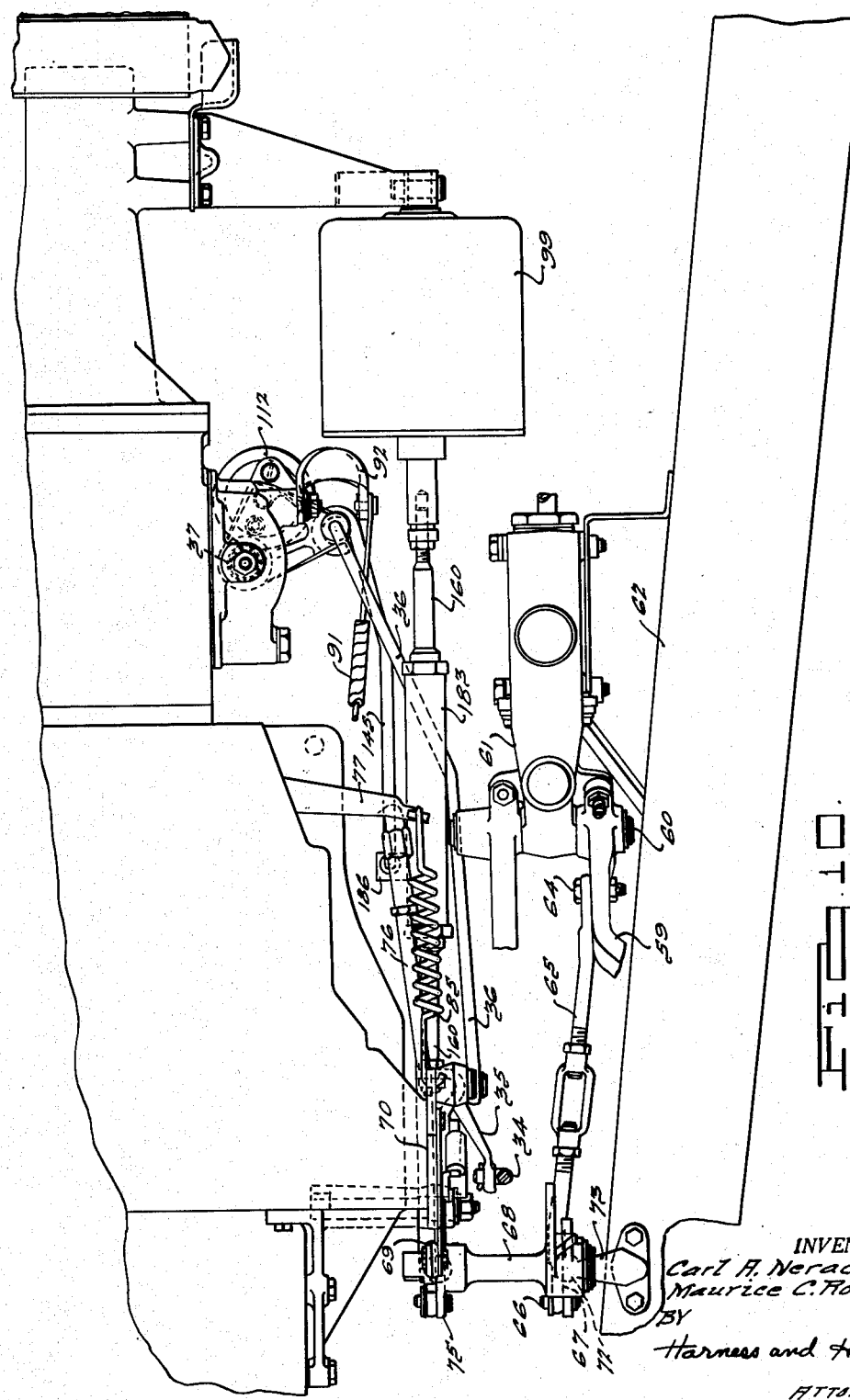

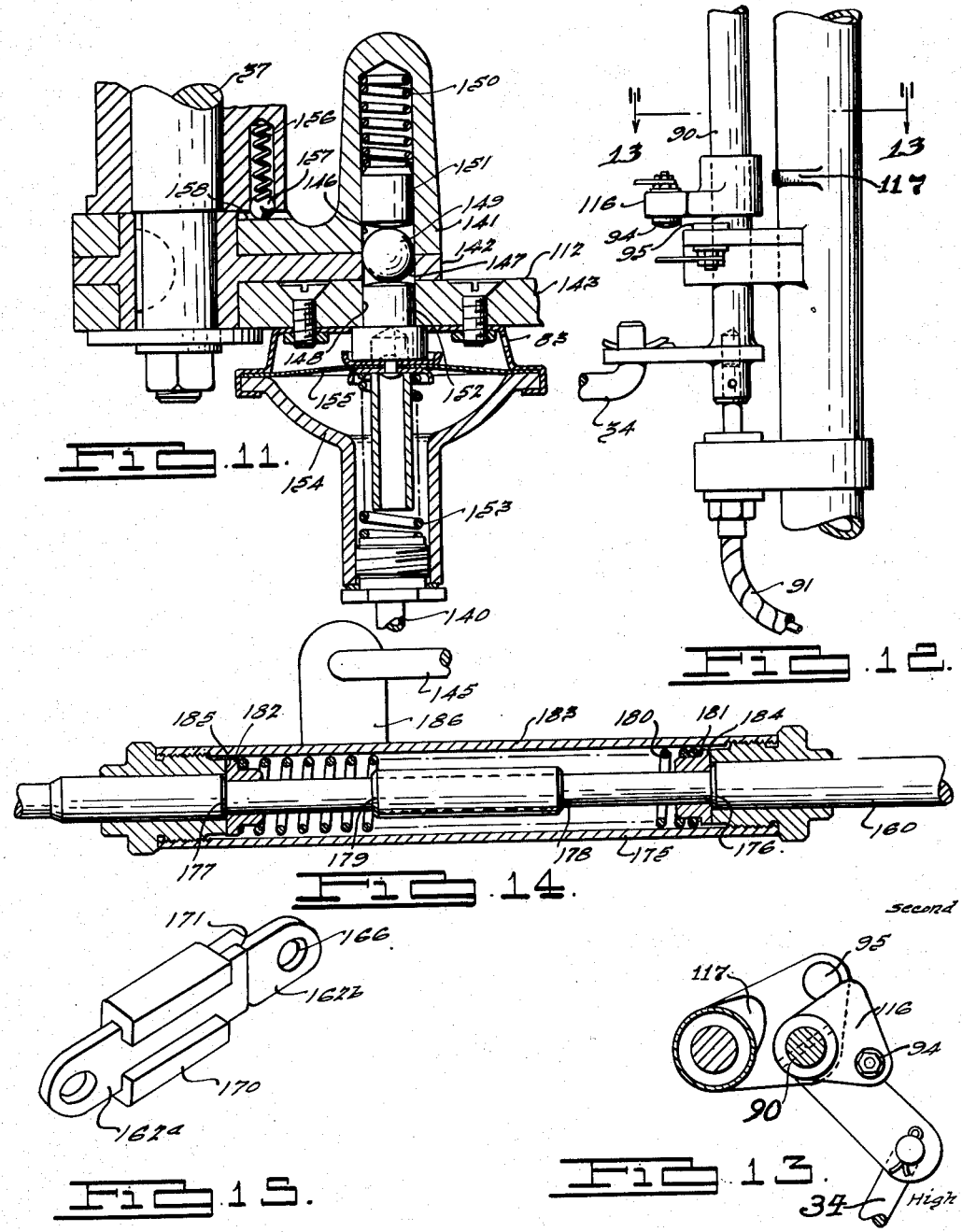

Patented Apr. 7, 1953

2,633,948

UNITED STATES PATENT OFFICE 2,633,948

TRANSMISSION CONTROL

Carl A. Neracher, Detroit, and Maurice C. Robinson, Royal Oak, Mich., assignors to Chrysler Corporation, Highland Park, Mich., a corporation of Delaware Application April 11, 1946, Serial No. 661,298

6 Claims. (Cl. 192—.073)

1

Our invention relates to motor vehicles and refers more particularly to power transmission and control mechanism therefor.

It is an object of our invention to provide a transmission system affording improved characteristics of change speed control with a comparatively simple mechanism capable of long life.

A further object is to provide a control system that may be superimposed on a conventional manually operated transmission and clutch without necessitating expensive construction changes in either the transmission or clutch.

Another object is to provide an improved transmission control system incorporating both manual and automatic change speed control.

We have provided a power operating system for controlling the operation of the change speed means that is relatively simple in construction so that it may be economically manufactured. We have chosen the differential air pressure derived from utilizing the engine intake suction or "vacuum," as it is commonly called, for a power source.

A further object of our invention is to utilize our transmission control in conjunction with a fluid coupling and to provide means to effect a clutch disengagement, a step-down in the transmission speed ratio drive from a relatively fast to a slower speed ratio drive and a reengagement of said clutch during a retardation of the vehicle speed below a predetermined speed. The predetermined vehicle speed may be selected to be the vehicle speed at which sudden reengagement of the clutch can occur without producing a perceptible change in vehicle speed. This predetermined vehicle speed is established as the vehicle speed at which the driven clutch elements are in synchronous speed relationship with the driving clutch elements immediately after the step-down in transmission speed ratio drive and when the driven clutch elements are rotating at a relatively fast speed compared to the vehicle speed due to the operative connection between transmission driving elements and the clutch driven elements. The speed of rotation of the driving clutch elements is controlled by the engine speed when it is idling under coast conditions with the clutch disengaged and no load on the engine. Under these conditions the above reengagement of the clutch will occur when the driving and driven elements are rotating at substantially the same speed and substantially no sudden change in vehicle speed or "lurch" will be produced thereby. The presence of a fluid coupling permits the vehicle speed retardation to continue until a substantially zero velocity is obtained without engine stall. The engine is able to idle with the vehicle stationary and the clutch engaged because of the slipping drive connection

2 made at the fluid coupling. Thereafter, upon acceleration a favorable torque multiplication is provided by the slower speed ratio drive and the increase in efficiency of the fluid coupling during acceleration.

According to our present embodiment of our invention we have utilized a transmission employing countershaft gearing and providing three forward speeds and reverse. The driver may be manually selecting automatic control and placing the shift lever in the position normally referred to as second speed position be provided with automatic change speed control between second and third forward speeds which will be adequate under normal driving conditions. First speed may be manually selected and used as an emergency low.

An additional object of the invention is to combine a movable transmission element adapted to change a transmission speed ratio drive with a novel automatic means for moving this element and with a manual means for moving the element. The automatic means has a cushioning means included in its operative connection with the element and the manual means is able to operate the element independently of the cushioning means. The automatic means, particularly where it is actuated by a vacuum cylinder, moves more rapidly than the transmission change in speed ratio drive can be effected. It is therefore necessary to incorporate a delaying means into the automatic means to delay the movement of the transmission components so that they may operate quietly and to their best advantage and so that the clutch disengagement can be assured prior to the effecting of the change in transmission speed ratio drive. Manual control does not require this delay and therefore means are provided herein for manually operating the transmission element independently of the delaying means.

An important feature of our invention is that if the automatic controls are completely inactivated manual control of the transmission is still possible.

To actuate the control system we have utilized a single "vacuum" cylinder provided with valving and a double acting piston. Sufficient motion of this piston in one direction will effect a clutch disengagement, a speed ratio change and a clutch reengagement.

Additional features of our invention are found in the provision of many features of improved construction and functional operation which will be more apparent from the following illustrative embodiments of the principles of our invention, reference being had to the accompanying drawings in which:

Fig. 5 is a diagrammatic view of the control mechanism;

Fig. 6 is a sectional elevational view of a portion of the mechanism carried by the transmission housing;

Fig. 7 is a section on the line 7—7 of Fig. 6;

Fig. 8 is a section on the line 8—8 of Fig. 6;

Fig. 9 is a side elevational view similar to Fig. 1 but is a somewhat larger view containing more detail;

Fig. 10 is a plan view of the Fig. 9 mechanism;

Fig. 11 is a sectional elevational view of the mechanism for selecting manual or automatic control;

Figure 12 is an enlarged view illustrating the switching means on the shift control mechanism;

Fig. 13 is a section on the line 13—13 of Fig. 12;

Fig. 14 is an enlarged view of the lost motion connection between the actuating piston and the transmission speed ratio control element; and Fig. 15 is a perspective view of one link in the "over center" toggle of the clutch release mechanism.

Figure 2:
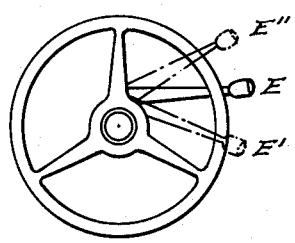
Fig. 2 is a plan view of the steering wheel and driver operable shift lever as viewed by the vehicle driver.

In the drawings A represents the internal combustion engine which drives through fluid coupling B and conventional type of friction main clutch C to the speed ratio transmission D from which the drive passes from the output shaft 20 to drive the vehicle rear wheels in the usual manner.

Figure 3:
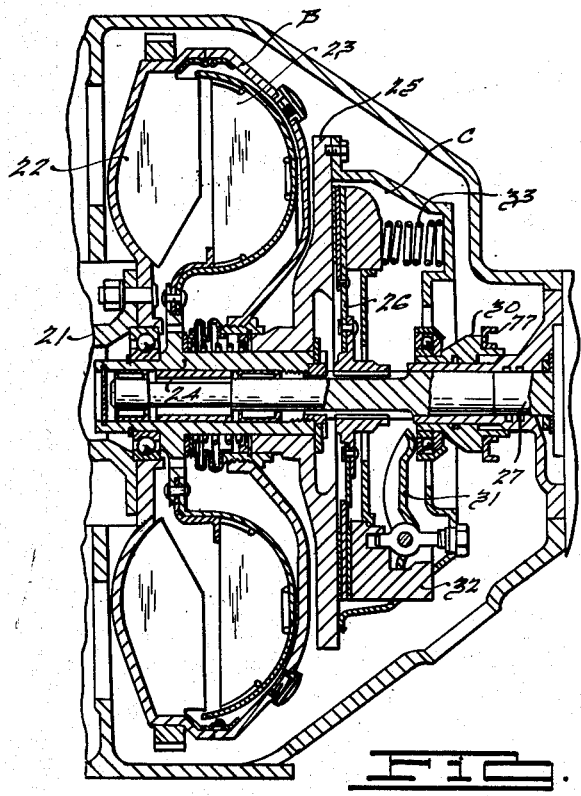
Fig. 3 is a longitudinal sectional elevational view through the main clutching mechanism.

The engine crankshaft 21 carries the vaned fluid coupling impeller 22 which in the well-known manner drives the vaned runner 23 whence the drive passes through hub 24 to clutch driving member 25. This member then transmits the drive, when clutch C is engaged as in Fig. 3, through driven member 26 to the transmission driving shaft 27 carrying the main drive pinion 28. A clutch pedal 29 controls clutch C such that when the driver depresses this pedal, yoke 77 and collar 30 are thrust forward to cause levers 31 to release the clutch driving pressure plate 32 against springs 33 thereby releasing the drive between runner 23 and shaft 27. The primary function of the main clutch C is to enable shifts to be made manually or automatically in transmission D.

Referring to the transmission, the main drive pinion 28 is in constant mesh with the gear 40 of the countershaft gear cluster mounted for rotation on the countershaft 41. This gear cluster, according to well-known practice, comprises a low speed gear 42, a second speed gear 43, and a reverse gear 44, which is in constant mesh with the reverse idler gear 45. The transmission output shaft 20 extends rearwardly to drive the ground wheels of the vehicle.

The driven shaft 46 integrally connected to output shaft 20 has mounted thereon the low speed and reverse gear 47 splined to the driven shaft for selective meshing with the countershaft low speed gear 42 or the reverse idler gear 45 for respectively transmitting a low speed drive to the driven shaft 46 or the drive thereto in a reversed direction. Freely rotatable on shaft 46 is the second speed gear 48 in constant mesh with the countershaft gear 43 for transmitting a second speed ratio drive. The gear 28 drivingly carries a set of circumferentially spaced external clutch teeth 49. In a similar manner the gear 48 drivingly carries a set of clutch teeth 50.

Splined on the shaft 46 adjacent the forward extremity thereof is an axially shiftable collar or sleeve 51. Blocker teeth rings 52 and 53 are carried by sleeve 51 and adapted for slight rotation relative to sleeve 51 whereby synchronizing of gear speeds prior to clutching of shaft 46 through collar 51 with either gears 28 or 48 is effected in a manner well-known in the art.

The transmission is illustrated in its neutral position. To establish the direct or high speed driving connection between shafts 27 and 20, the collar 51 is shifted axially to the left as viewed in Fig. 4 by the control means hereinafter described to engage the teeth 49 drivingly connected to the gear 28 carried by the driving shaft 27, and when so connected, the collar is drivingly carried by the shaft 46. The second speed driving connection is established by similarly moving the collar 51 to the right as viewed in Fig. 4 to engage teeth 50 carried by gear 48. The first or low speed is obtained by moving gear 47 which is splined to driven shaft 20 forwardly in Fig. 4 into engagement with countershaft low speed gear 42. The drive then occurs from shaft 27 through main drive pinion 28, countershaft gear 40, countershaft low speed gear 42, gear 47, and driven shaft 20. Reverse drive is obtained by engaging gear 47 with reverse idler gear 45. The transmission mechanism thus described is an embodiment conventionally employed in motor vehicles.

When manual operation has been selected by the vehicle driver in a manner to be described herein, the drives are selectively controlled by operating lever 55 and clutch pedal 29. Clutch pedal 29 is mounted on lever 59 which is rotatably mounted on shaft 60 shown in Fig. 10 as attached to the usual master cylinder 61 of the vehicle's hydraulic braking system. It is to be understood that shaft 60 could be affixed to the vehicle frame 62 or any other stationary member. Lever 59 is provided with extension 63 extending beyond shaft 60. Bolt 64 fastens forwardly extending rod 65 to extension 63. Rod 65 is rotatably mounted at 66 on arm 67 rotatably mounted on shaft 68. Shaft 68 is rotatably mounted by a ball and socket joint on arm 69 fastened to flexible plate 70 which is fastened to clutch housing 56 at 57. Arm 69 and plate 70 support one end of shaft 68. The outward end of rod 68 is also provided with a ball and socket connection at 72 with member 73 fastened to frame 62.

Figure 1:
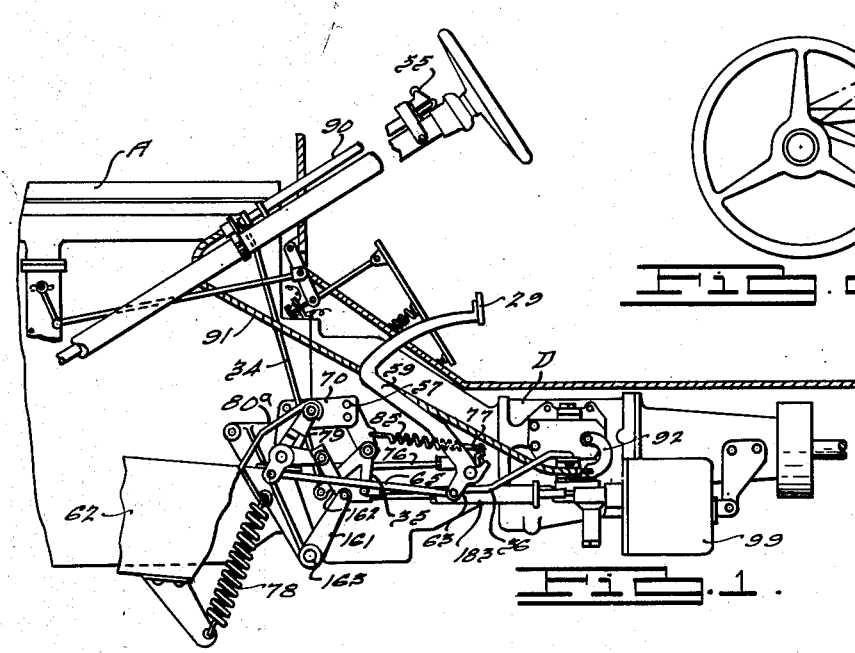
Fig. 1 is a side elevational view of the power plant and transmission for a motor vehicle.

The ball and socket joints and flexible nature of plate 70 prevent the transmission of engine vibration to clutch lever 59. A downwardly projecting leg 75 rotatably carried by shaft 68 has rearwardly extending rod 76 rotatably fastened thereto. Rod 76 is fastened to clutch fork 77. Overcenter spring 78 has one end fastened to the frame (Fig. 1) and the other end, through rod 80ª, fastened to extension 79 of arm 67.

Depression of clutch lever 59 rotates extensions 63 counterclockwise about shaft 60 and retracts rod 65. The rearward movement of rod 65 rotates arm 67 in a counterclockwise direction and through lugs 81 and 82 moves leg 75 and rod 76 to the right in Fig. 5. This pivots bifurcated clutch fork 77 about fulcrum 80 (see Fig. 5) and disengages clutch C. Overcenter spring 78 assists the driver in the last portion of movement required to disengage clutch C. Spring 85 returns the mechanism to its Fig. 9 position when the driver releases pedal 29.

Manual operation of gearshift lever 55 may be utilized to control the transmission. Lifting lever 55 in a plane containing the control rod 90 will through Bowden wire 91 control transmission selector lever 92. Rotation of lever 55 from position E to position E' or E'' in Fig. 2 will through the link and lever system 34, 35, 36 to the transmission control shaft 37 thereby operate the transmission speed ratio control element which has been selected by longitudinal movement of rod 90.

Transmission D is provided with control means comprising selector cam 100 keyed to shaft 101 which is keyed to selector lever 92. Lifting lever 55 pulls Bowden wire 91 and rotates lever 92, shaft 101 and cam 100. The outward end of cam 100 is lifted by this movement. Control shaft 37 (Fig. 6) is rotatably mounted in the transmission housing. Cylindrical lever 102 surrounds shaft 37 and pin 103 mounted normal to the axis of the shaft fastens the lever to the shaft. Relative axial rotation is prevented by pin 103 but slight rotation of lever 102 on pin 103 is possible. Cylindrical lever 102 is provided with finger 104 adapted to penetrate the openings provided in forks 105 and 106 on shift rails 107 and 108. Spring 109 urges finger 104 to its downward position. Fork 105 engages collar 97 on low speed and reverse gear 47. Fork 106 engages collar 51 for selecting second or direct transmission drive. Gearshift fork guide rail 144 supports the weight of forks 105 and 106. As illustrated in Fig. 6 finger 104 is normally in engagement with the fork 106 on the second speed and direct drive shift rail.

In operation, lever 55 is lifted or lowered to select the fork 105 or 106 which finger 104 is to move. Rotation of lever 55 to its E' or E'' position will rotate shaft 37 and finger 104 thereby moving collar 97 or 51 depending upon whether finger 104 moved fork 105 or 106.

In our invention an automatic control of second speed and direct drive is superimposed upon the above power transmission. Referring to Fig. 5 the control is diagrammatically illustrated. A double acting piston or movable member 110 actuated by differential pressure induced by manifold "vacuum" or low pressure in cylinder or compartment 111 of housing 99 is the source of power for actuating the clutch release fork 77 and transmission fork 105. Solenoid controls and switches are provided to control the time and direction of movement of piston 110. A selector 112 is provided so that the vehicle driver may select manual or automatic transmission control.

In Fig. 5 the usual grounded storage battery 113 supplies electric energy through ammeter 114 to manual dash switch 115 thence to switch 116 provided on the lower end of the shift control rod 34. Switch 116 is adapted to be closed through terminals 94 and 95 (Fig. 13) when the shift lever 55 is in its second speed or lower E'' position. In this position the terminals 94 and 95 are in contact. In the direct drive or lower E' position of the shift lever the terminals are in the same plane normal to the control shaft but on different radii. In the reverse drive or upper E'' position of the control lever the control rod and terminal 94 are lifted and terminal 94 is above terminal 95. Lug 117 will prevent the contact of terminals 94 and 95 by holding terminal 94 in its upper position. When the control lever is placed in the low speed or upper E' position, the terminal 94 is lifted and rotated relative to terminal 95.

Figure 4:
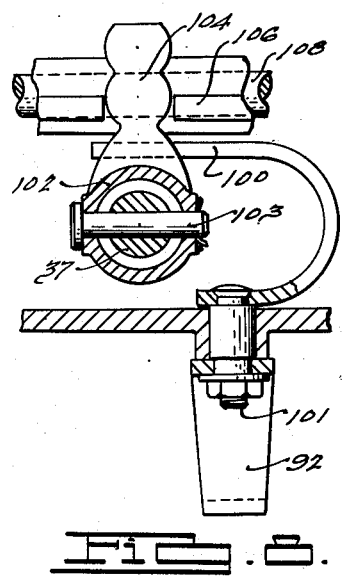
Fig. 4 is a similar view through the transmission.

Switch 116 is connected in parallel to two secondary circuits at 118. The first of these secondary circuits leads to solenoid 119 controlling valve 120. Solenoid 119 is grounded at 121. Valve 120 is interposed between line 122 connected to the engine manifold and line 123 directed to cylinder 111. When solenoid 119 is energized line 122 is connected to line 123 and when solenoid 119 is deenergized the valve 120 is spring returned to closed position, venting line 123 through screen 98. The second secondary circuit leads from connection 118 through switch 124 adapted to be closed when the usual accelerator pedal 125 is released by the operator and spring returned to its normal upward position. A centrifugal vehicle speed responsive governor 126 driven from some suitable source such as gear 127 in Fig. 4 is adapted to connect terminal 128 with terminal 129 above a predetermined vehicle speed. Spring 130 disconnects terminal 128 from terminal 129 and engages terminal 128 with terminal 131 below this predetermined vehicle speed. Terminals 129 and 130 are electrically connected to grounded solenoids 132 and 133 respectively by leads 134 and 135. Solenoids 132 and 133 control valves 136 and 137 which selectively open and close ports 138 and 139 connecting line 123 with opposite ends of cylinder 111. Valves 136 and 137 are spring returned to closed position as by spring 93 when their solenoids are deenergized. The ends of cylinder 111 are vented through screens 81ᵃ and 82ᵃ when the valves are closed.

Selector 112 is connected by line 140 with line 123. Referring to Figs. 5, 11, and 6 the construction of the selector is illustrated. Three parallel plates 141, 142, and 143 comprise the power transmitting mediums. Middle plate 142 is keyed to the transmission control shaft 37. Plate 141 is operatively fastened to manually controlled rod 36. Plate 143 is operatively fastened to rod 145 which is operatively connected in a manner to be described herein to piston 110. Plates 141 and 143 are both rotatably mounted on transmission control shaft 37. Means are provided to selectively connect plates 141 or 143 to plate 142. Each plate is provided with a transverse circular opening 146, 147, or 148. The openings are of uniform diameter. A spherical ball 149 is positioned in opening 147 of plate 142. The thickness of plate 142 approximates the radius of ball 149. Hence, when ball 149 is aligned with one surface of plate 142 its widest portion is aligned with the opposite surface of plate 142 and approximately one-half its volume has penetrated the opening in plate 141 or 143. Therefore, the position of ball 149 determines which rotatable plate is locked to plate 142.

Spring 150 and plunger 151 provided in plate 141 urge ball 149 into the opening 148 in plate 143. Plunger 152 and spring 153 urge ball 149 toward plate 141. Spring 153 is stronger than spring 150. Diaphragm 155 fastened to plate 143 defines a chamber 154 connected to a source of manifold suction or "vacuum" by line 140 so as to overcome spring 153 and retract plunger 152 when air is withdrawn from chamber 154. A bleed hole 83 is provided in the wall of chamber 154. Therefore, when a partial vacuum exists in chamber 154 spring 153 is overcome and spring 150 forces ball 149 into opening 148 in plate 143 thereby operatively connecting plates 142 and 143 to effect control of transmission shaft 37 by piston 110. When atmospheric pressure exists in chamber 154 spring 153 overcomes spring 150 and forces the ball 149 into opening 146 in plate 141. This operatively connects plates 141 and 142 to effect control of transmission shaft 37 by manually controlled rod 36. Slot 156 in plate 141 and spring 156 and ball 157 in the transmission housing cooperate to restrain movement of plate 141 out of its neutral position. Plate 142 is always operatively connected to one of plates 141 or 143 and the opening in the third plate must be aligned with ball 149 before a transfer in operative plate connections can be effected.

Referring to Fig. 5 piston rod 160 is illustrated fastened to piston 110. Means to disengage clutch C are connected to the end of piston rod 160. An overcenter toggle comprising legs 161 and 162 is rotatably fastened to piston rod 160. Leg 161 is rotatably fastened at 163 to a fixed surface such as the frame. Leg 162 is rotatably connected at 166 to one leg 164 of a bellcrank. The other leg 75 of the bellcrank has fastened thereto a rod 76 connected to clutch fork 77. Leg 162 of the toggle is adapted to transmit force in one direction only. Leg 162 is composed of two relatively slidable portions 162$^a$ and 162$^b$. Portion 162$^b$ has a track 170 and abutment 171 formed thereon. Therefore, portion 162$^a$ when pushed against abutment 171 will transmit force but unobstructed relative motion in the opposite direction is permitted. This connection is used so that when clutch pedal 29 is depressed, rod 65 retracted and the bellcrank rotated counterclockwise to manually disengage clutch C the rod 160 and piston 110 will not be disturbed. The bellcrank is mounted on shaft 68. One complete stroke of piston 110 will disengage and reengage clutch C. For example, as piston 110 moves to the left in Fig. 5 piston rod 160 straightens toggle 161 and 162 increasing the distance between points 163 and 166. The counterclockwise rotation of the bellcrank moves rod 76 and the lower portion of clutch form 77 to the right in Fig. 5 thereby disengaging clutch C. Further movement of piston rod 160 brings the toggle legs 161 and 162 "over center" and permits springs 33 to reengage clutch C.

A lost motion connection (Fig. 14) 175 is provided between piston rod 160 and transmission shift control rod 145. Piston rod 160 is provided with abutments 176 and 177. A spring 180 surrounds rod 160 and engages slidable members 181 and 182. Housing 183 is provided with abutments 184 and 185 and lug 186. Transmission shift control rod 145 is fastened to lug 186. As rod 160 is moved to the left in Fig. 5 rod abutment 176 carries member 181 and spring 180 is compressed between member 181 carried by the rod and member 182 engaging housing abutment 185. When spring 180 has been compressed beyond a predetermined point it overcomes the force required to actuate the transmission mechanism and moves housing 183, lug 186, and rod 145 to the left until member 182 engages abutment 177 of rod 160. A similar motion occurs when rod 160 moves to the right in Fig. 14. Abutment 177 on rod 160 picks up member 182 and compresses spring 180. When the spring pressure becomes sufficiently great the spring moves member 181 and housing 183 to the right until member 181 engages rod abutment 176. Rod abutments 178 and 179 are provided to initiate the housing motion in the event of spring failure.

In operation our automatic control is initiated by closing dash switch 115 and placing shift lever 55 in its second speed or lower E" position thereby closing switch 116. The transmission is now in its second speed drive because it was manually placed therein by the above movement of shift lever 55. Accelerator pedal 125 is depressed as the vehicle accelerates in second speed drive. When the predetermined vehicle speed has been reached governor 126 overcomes spring 130 contacting terminals 128 and 129. The driver then releases accelerator pedal 125 closing switch 124 thereby initiating an upshift. Under these conditions electrical energy from grounded battery 113 passes through ammeter 114, dash switch 115, switch 116, point 118 and solenoid 119 to ground 121. This energizes solenoid 119 opening valve 120 and connecting line 23 to the manifold suction or "vacuum." Manifold suction from line 23 withdraws air from chamber 154 causing diaphragm 155 to overcome spring 153 and permitting spring 150 to seat ball 149 in the openings in plates 142 and 143 thereby operatively connecting rod 145 and transmission control shaft 37. Finger 104 is in the opening provided in shift rail 106 which is connected to transmission sleeve 51 controlling second speed and direct drive transmission gearing. Electrical energy under the above conditions also passes from point 118 through accelerator switch 124, terminals 128 and 129, lead 134, and through solenoid 132 to ground. The energizing of solenoid 132 opens valve 136 connecting port 138 with line 123. Valve 137 is vented at 82. Air is withdrawn from cylinder 111 and piston 110 is moved from the left end (in Fig. 5) of cylinder 111 to the right towards the piston position illustrated in Fig. 5. The initial portion of the piston movement straightens toggle 162 rotating the bell crank counterclockwise and disengaging clutch C. At this time further movement of piston 110 causes spring 180 in lost motion connection 175 to move housing 183 to the right thereby moving lug 186 and rod 145 to the right rotating plates 142 and 143 of selector 112 and rotating transmission control shaft 37. This rotation of control shaft 37 moves finger 104 to the left in Fig. 5 thereby shifting fork 106 and sleeve 51 to the left in Fig. 4 causing a transmission upshift to direct drive. Further motion of piston 110 carries toggle 162 "over center" and permits springs 33 to reengage clutch C. The driver then depresses accelerator pedal 125 incident to normal driving and increased vehicle speed.

If under normal driving conditions the driver next wishes to bring the vehicle to a stop the accelerator pedal 125 is released to partially close the usual throttle and reduce engine speed. Switch 124 is closed by this action. When vehicle speed is reduced below a predetermined point governor 126 retracts permitting spring 130 to contact terminals 129 and 131 thereby energizing solenoid 133 through lead 135 and deenergizing solenoid 132. The energizing of solenoid 133 opens valve 137 connecting port 139 with line 123. Manifold suction then withdraws air from the left side of cylinder 111 in Fig. 5 moving piston 110 to the left. The movement of piston 110 straightens toggle 162 thereby disengaging clutch C. Further movement of piston rod 160 causes loaded spring 180 to react thereby moving housing 183, lug 186, and rod 145 to the left in Fig. 5. This rotates plates 142 and 143 of selector 112 thereby rotating transmission control shaft 37 and finger 104 shifting fork 106 and collar 51 and preparing the transmission for a second speed drive through shaft 27, pinion 28, countershaft gears 40 and 43, gear 48 and driven shaft 20 when further movement of piston 110 pushes toggle 162 "overcenter" permitting clutch C to reengage.

It is considered an important feature of our invention that the above clutch reengagements have occured suddenly and particularly in the preceding paragraph of the above description before the vehicle has completely stopped. The governor 126 initiates the step-down in the transmission speed ratio drive described above at a predetermined speed. This predetermined speed is established as the speed at which the sudden reengagement of clutch C can occur without causing any substantial sudden change in vehicle speed or "lurch." When piston 110 has moved sufficiently to disengage clutch C and initiate the movement of collar 51 preparing the transmission for a second speed drive it is desirable that at this time the clutch driving member 25 and driven member 26 be rotating at substantially the same speed so that when they are reengaged a "lurch" will not be produced. The clutch driving member 25 is at this time rotating at a speed determined by the engine speed under substantially closed throttle conditions. The speed of rotation of the driven clutch member 26 is determined by the vehicle speed and the transmission speed ratio drive effected by the above movement of collar 51. Therefore, the governor 126 is set to be responsive to the vehicle speed which will effect the desired speed of rotation of the clutch driven member 26. In this manner reengagement of clutch C controlled by governor 126 at the proper vehicle speed will be synchronized so that its effect upon vehicle speed will be negligible and no lurch will be produced. The continued retardation of vehicle speed under these substantially closed throttle conditions will occur until the vehicle has come to a substantially stationary position. It is possible for the vehicle to be stationary with the engine idling and the clutch engaged because of the slipping drive connection in fluid coupling B. The vehicle may remain stationary until the driver desires to resume motion. Depression of accelerator pedal 125 will accelerate the vehicle in the speed ratio drive which was effected by the above movement of piston 110. When suitable vehicle speed has been obtained a step-up in speed ratio drive may be initiated as explained above.

If the driver desires to change the transmission control from automatic to manual the shift lever 55 is moved to the position corresponding to the transmission drive then in operation. This aligns the openings in plates 141, 142, and 143. The movement of shift lever 55 opens switch 116 deenergizing solenoid 119 and closing valve 120. Dash switch 115 should also be opened so that automatic control will not be initiated the next time lever 55 is moved to its second speed position. Spring 153 causes ball 149 to penetrate the opening 146 in plate 141 thereby operatively connecting rod 36 and control rod 37. Manual control of transmission D by shift lever 55 is then possible. Manual control of clutch C is always possible due to the sliding connection in toggle leg 162.

The lost motion connection 175 is so positioned that its cushioning effect is present in the linkage connecting the piston 110 with the transmission control shaft 37. It is important that the manual linkage connecting shift control lever 55 with the transmission shift rails is operative independently of the resilient connection 175. When the selector 112 connects plates 142 and 141 by means of ball 149 they are disconnected from plate 143 and operate independently thereof so that the driver may make manual shifts independently of the lost motion connection.

We claim:

1. In a drive for a motor vehicle having an engine, the combination of a variable speed ratio transmission having driving and driven elements therein and a control element the direction of movement of which selects the speed ratio between driving and driven transmission elements, a housing having a cylinder therein, a piston adapted to reciprocate in said cylinder, means for creating pressure differentials in said cylinder between the opposite sides of said piston to thereby selectively move said piston in either of two opposite directions, a resilient connection between said piston and said control element operable to transmit motion to said control element to move the latter in either of two directions depending on the direction of movement of said piston, a clutch adapted to drivingly connect and disconnect said engine from said transmission and having a control member, means operatively connecting said piston and said clutch control member whereby movement of said piston in either direction disengages and reengages said clutch before said resilient connection moves said transmission control element in response to movement of said piston.

2. In a drive for a motor vehicle having an engine the combination of a variable speed ratio transmission, a normally engaged clutch adapted to drivingly connect and disconnect said engine with said transmission, a housing having a cylinder therein, a piston slidably mounted in said cylinder, means for effecting movement of the piston in either of two directions by inducing a pressure differential between opposite sides thereof, a piston rod, linkage containing an overcenter toggle operatively connected to said piston rod and said clutch whereby movement of said piston rod in either direction disengages and reengages said clutch, a housing slidably mounted on said piston rod, linkage connecting said housing with said transmission, abutments on said piston rod and said housing, a spring engaging said abutments whereby movement of said piston rod induces stress in said spring which moves said housing when the stress exceeds a predetermined amount and whereby said transmission linkage is actuated while said clutch is disengaged.

3. In a drive for motor vehicle having an internal combustion engine provided with an intake manifold, a throttle and an accelerator pedal, a variable speed ratio transmission provided with a manually operable shift control rod having a first, a second, and a third forward speed position, a reverse position, and a neutral position, a clutch adapted to drivingly connect and disconnect said engine from said transmission, a housing having a cylinder therein, a piston slidably mounted in said cylinder, means for effecting movement of the piston in either of two directions by inducing a pressure differential between opposite sides thereof, linkage connecting said piston with said clutch whereby movement of said piston in either direction disengages and reengages said clutch, linkage connecting said piston with said transmission adapted to select one speed ratio drive in said transmission when said piston moves in one direction and adapted to select another speed ratio drive in said transmission when said piston moves in the opposite direction, means to actuate said transmission linkage during the interval when said clutch is disengaged, an electrical circuit comprising a grounded source of electric energy, a first switch operatively connected to said shift control rod and adapted to be closed when said rod is in its second forward speed position and open when said rod is in any of its other positions, an electrical connection between said first switch and said source, a first air tight connection between said cylinder and said manifold, a normally closed grounded solenoid valve in said connection, an electrical connection between said first switch and said solenoid valve, a second switch operatively connected to said accelerator pedal and adapted to be closed when said accelerator pedal approaches a closed throttle position, an electrical connection between said first switch and said second switch, a two-way switch having one inlet and two outlet terminals, a vehicle speed responsive governor adapted to electrically connect said inlet terminal and one of said outlet terminals below a predetermined vehicle speed, and electrically connect said inlet terminal and the other of said outlet terminals above said predetermined vehicle speed, an electrical connection between said second switch and said inlet terminal of said two-way switch, a second normally closed grounded solenoid valve at one end of said cylinder, a third normally closed grounded solenoid valve at the other end of said cylinder, an air tight connection between each of said second and third solenoid valves and said first connection, an electrical connection between said second solenoid valve and one of said outlet terminals and an electrical connection between the third solenoid valve and the other of said outlet terminals whereby movement of said piston by manifold suction is dependent upon the concurrent closing of said first switch, said second switch, and said two-way switch and the direction of motion of said piston is dependent upon the position of said two-way switch, said position being determined by vehicle speed.

4. In a control for a motor vehicle transmission and clutch having an engaged and disengaged position, a housing having a chamber therein, a member movably mounted in said chamber, means for creating pressure differentials in said chamber between the opposite sides of said member to thereby selectively move said member in either of two opposite directions, a release fork on said clutch, springs urging said clutch to engaged position, a rotatably mounted bellcrank having a first and a second arm, linkage connecting the first arm of said bellcrank to said release fork, an overcenter toggle having two legs fastened for relative rotation and having one end of one leg thereof rotatably mounted on said second arm of said bellcrank and the other end of the second leg thereof rotatably mounted on a stationary pivot, said member being mechanically connected to said legs, whereby movement of said member in either direction will extend said toggle, rotate said bellcrank and disengage said clutch as said toggle approaches a position where said legs are parallel and whereby further movement of said member throws said toggle overcenter permitting said clutch springs to reengage said clutch.

5. In a motor vehicle having a clutch and a transmission, an element associated with said transmission and adapted to change the transmission speed ratio drive when moved, a control mechanism for said element and clutch comprising a double acting motor having a compartment and piston slidably mounted therein, said control mechanism including means for creating pressure differentials in said compartment to selectively move said piston in either of two directions, means to cause motion of said piston in either direction to disengage said clutch, move said element and reengage said clutch, said control mechanism including yielding means governing the movement of said element by said piston, and manual means to move said element independently of said yielding means, and manual means to disengage said clutch.

6. In a drive for a motor vehicle the combination of an engine, an accelerator pedal for controlling the speed of said engine, a variable speed ratio transmission having a control element, a clutch adapted to drivingly connect and disconnect said engine from said transmission, said clutch having driving and driven elements therein, means to disengage said clutch, change the transmission speed ratio and reengage said clutch while the vehicle is in motion, said means comprising a housing having a compartment therein, a member mounted for movement in said compartment, means for creating pressure differentials in said compartment between the opposite sides of said member to thereby selectively move said member in either of two opposite directions, a resilient connection between said member and said transmission control element operable to transmit motion to said transmission control element to move the latter in either of two directions depending on the direction of movement of said member, means operatively connecting said member and said clutch and operable to disengage and reengage said clutch in response to movement of said member in either of said directions, said resilient connection accommodating disengagement of said clutch before said resilient connection moves said transmission control element in response to movement of said member and vehicle speed responsive means to initiate movement of said member in response to manipulation of said accelerator pedal to a predetermined position during operation of said vehicle under predetermined vehicle speed conditions.

CARL A. NERACHER.
MAURICE C. ROBINSON.

REFERENCES CITED

The following references are of record in the file of this patent:

UNITED STATES PATENTS

| Number | Name | Date |
|---|---|---|
| 905,637 | Beskow | Dec. 1, 1908 |
| 2,098,691 | Neff | Nov. 9, 1937 |
| 2,129,259 | Boughton | Sept. 6, 1938 |
| 2,156,589 | Hopkins | May 2, 1939 |
| 2,177,662 | Kliesrath et al. | Oct. 31, 1939 |
| 2,241,071 | Price | May 6, 1941 |
| 2,257,674 | Dunn | Sept. 30, 1941 |
| 2,282,053 | Hey | May 5, 1942 |
| 2,319,515 | Priebe | May 18, 1943 |
| 2,322,479 | Schjolin | June 22, 1943 |
| 2,326,943 | Hill | Aug. 17, 1943 |
| 2,328,921 | Neff | Sept. 7, 1943 |
| 2,536,462 | Price | Jan. 2, 1951 |